(12) United States Patent
Meyer et al.

(10) Patent No.: US 6,721,142 B1
(45) Date of Patent: Apr. 13, 2004

(54) NON-CORROSIVE GMR SLIDER FOR PROXIMITY RECORDING

(75) Inventors: Dallas W. Meyer, Danville, CA (US); Tien-Chih Lin, Fremont, CA (US); Michael A. Stacy, Palo Alto, CA (US)

(73) Assignee: Western Digital (Fremont) Inc., Lake Forest, CA (US)

( * ) Notice: Subject to any disclaimer, the term of this patent is extended or adjusted under 35 U.S.C. 154(b) by 42 days.

(21) Appl. No.: 09/747,202

(22) Filed: Dec. 21, 2000

(51) Int. Cl.[7] .............................. G11B 5/39; G11B 5/187
(52) U.S. Cl. ..................................... 360/324.1; 360/122
(58) Field of Search .............................. 360/317, 318, 360/323, 324, 122, 126, 324.1, 324.11, 324.12, 324.2; 29/603.12

(56) References Cited

U.S. PATENT DOCUMENTS

| | | | |
|---|---|---|---|
| 4,188,247 A | 2/1980 | Ridgway et al. | 156/154 |
| 4,948,460 A | 8/1990 | Sandaiji et al. | 216/22 |
| 5,003,688 A | 4/1991 | Terada et al. | 29/603.18 |
| 5,013,394 A | 5/1991 | Rolland et al. | 216/22 |
| 5,696,654 A * | 12/1997 | Gill et al. | 360/315 |
| 5,735,036 A | 4/1998 | Barr et al. | 29/603.12 |
| 5,761,790 A | 6/1998 | Carr et al. | 29/603.15 |
| 5,777,824 A | 7/1998 | Gray | 360/234.8 |
| 5,805,380 A | 9/1998 | Ishihara et al. | 360/235.2 |
| 5,822,153 A * | 10/1998 | Lairson et al. | 360/234.7 |
| 5,901,431 A | 5/1999 | Santini | 29/603.14 |
| 5,903,969 A | 5/1999 | Haga | 29/603.18 |
| 5,943,187 A | 8/1999 | Chen et al. | 360/235.2 |
| 5,986,851 A | 11/1999 | Angelo et al. | 360/235.2 |
| 5,991,119 A * | 11/1999 | Boutaghou et al. | 360/234.7 |
| 5,999,380 A * | 12/1999 | Slade et al. | 360/122 |
| 6,201,669 B1 * | 3/2001 | Kakihara | 360/313 |
| 6,282,043 B1 * | 8/2001 | Korenari | 360/66 |
| 6,324,747 B1 * | 12/2001 | Boutaghou et al. | 29/603.12 |
| 6,369,993 B1 * | 4/2002 | Hayashi | 360/327.2 |
| 6,427,319 B1 * | 8/2002 | Cook et al. | 29/603.12 |
| 6,493,179 B2 * | 12/2002 | Kohira et al. | 360/97.01 |
| 6,493,193 B2 * | 12/2002 | Honma et al. | 360/313 |
| 2003/0099069 A1 * | 5/2003 | Kagami et al. | 360/313 |

* cited by examiner

*Primary Examiner*—Jefferson Evans
(74) *Attorney, Agent, or Firm*—Stetina Brunda Garred & Brucker

(57) ABSTRACT

A slider (34) for reading data from a disk surface (80), the slider (80) including a magneto-resistive head (36). The head (36) includes a transducer (58) having a stack of layers (59), each layer (62,66,70,74) having a proximal end (64, 68,72,76) proximal to the disk surface, and a pair of electrical leads (82), connected to the transducer (58), each one of the electrical leads (82) also having a proximal end (83) proximal to the disk surface (80). At least one of the proximal ends (83) of the electrical leads (82) and the layers (66) is recessed to provide one or more recessed areas (92). The recessed areas (92) are then filled with protective material (94) to a depth such that when the layer of protective material (48) is worn from the proximal ends (64,68, 72,76,83) by burnishing by the disk surface (80), protective material (94) still remains in the recessed areas (92). Also disclosed is a method of fabrication of a slider (80) having recessed areas (92) filled with protective material (92) which protect materials from corrosion and electrical spiking.

6 Claims, 8 Drawing Sheets

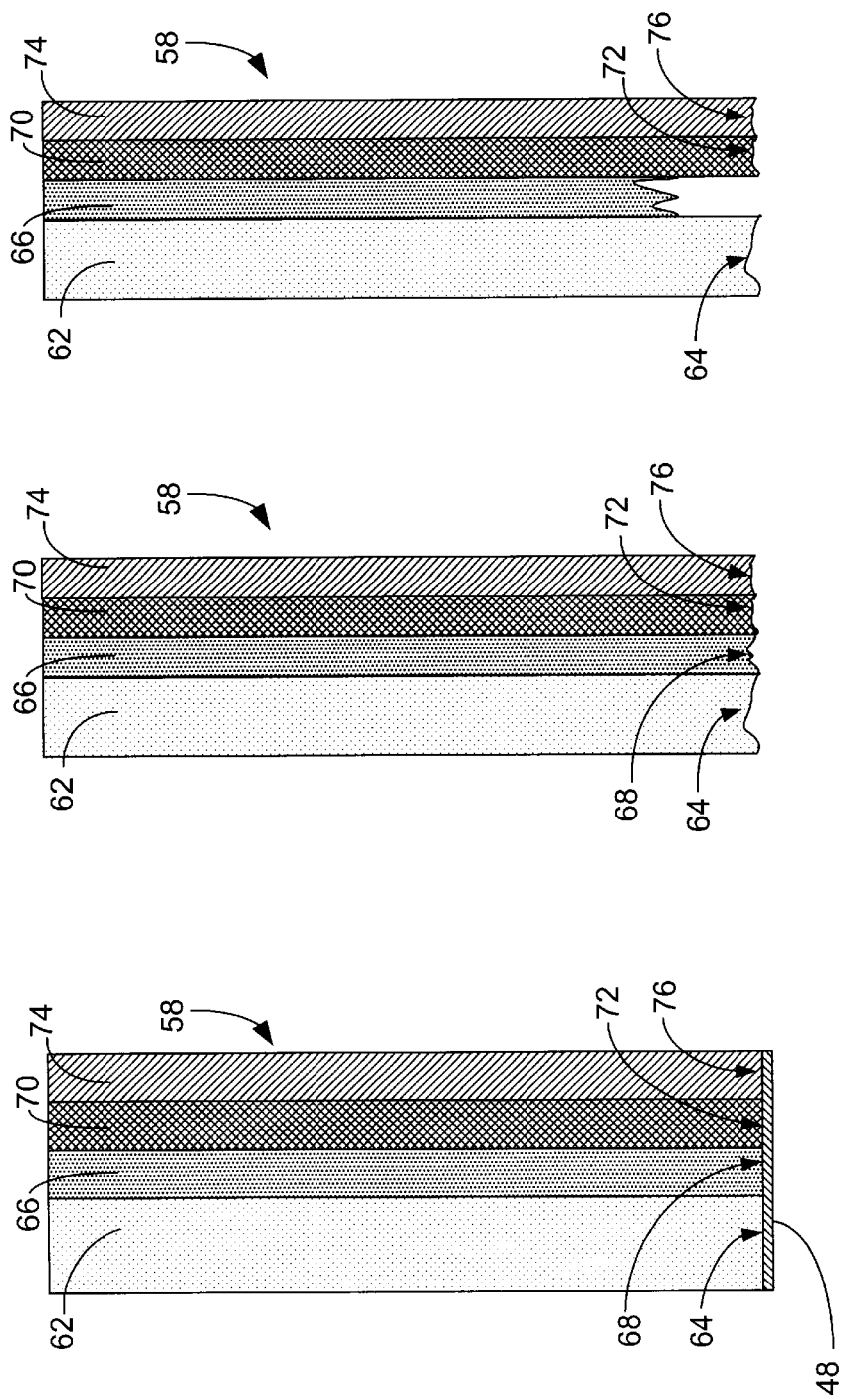

NON-CORROSIVE GMR SLIDER FOR PROXIMITY RECORDING

TECHNICAL FIELD

The present invention relates generally to recording heads used in magnetic media storage devices, and more particularly to magneto-resistive disk drive heads.

BACKGROUND ART

Disk drives containing Giant Magneto-Resistive (GMR) heads typically are supported above a disk drive surface by a thin film of air. The Air Bearing Surface (ABS) of the head flies above the disk surface by the air layer produced by the rotation of the disk surface beneath the head. Since the sensitivity of the head sensor depends on the gap spacing of the ABS above the disk surface, it is desirable that this gap distance be as small as possible, in order to produce the maximum sensitivity in the sensor. The typical gap spacing is currently as small as 0.6 micro-inch ($10^{-6}$ inch). At such close distances, the slightest surface irregularity can cause the ABS to contact the disk surface at least briefly. Typical proximity recording sliders made using inductive transducer technology are subjected to large amounts of substrate and transducer wear during the initial hours of the drive operational life. Currently, fly heights of GMR heads have reaching a point where some level of interference is required, and similar levels of wear on some heads will be expected. This process, wherein the head is expected to contact points on the disk surface and thereby remove these higher points is commonly referred to as "drive burnishing".

To reduce wear on the sensitive transducer elements, a protective coating, typically of some very hard substance such as Diamond-Like Carbon (DLC) is used, but again, by interposing this protective layer, the separation distance between the transducer sensor and the disk surface is necessarily increased, with an attendant decrease in sensitivity. Therefore, to maximize performance of GMR heads, the DLC protective layer has typically been reduced in thickness to less than 0.2 micro-inch. With such a thin protective layer, any wear of the surface of the GMR element, will expose the transducer structure to the drive environment.

In addition, the magneto-resistive head operates by passing a voltage differential across the sensor element, so that changes in the resistance of the element in response to magnetic field changes by domains on the disk are used to read data. When the protective layer is abraded away, the voltage differential across the element will cause some level of unprotected shorting to the disc in areas where the media carbon is absent.

GMR elements are similar in material composition to previous Anisotrophic Magneto-Resistive (AMR) heads, with the exception of several spacer layers, including copper. Although copper which is protected by an intact DLC layer generally does not corrode, it has been determined that exposed copper is subject to corrosive attack at the air-bearing surface, either during head fabrication or while in the disc drive (due to pin-holes or damage to the DLC). In order to decrease corrosion of the copper when the DLC is damaged, typical solutions rely on drive chemical filters and residual disc lubricant to protect this critical layer. These solutions provide less complete protection to the copper than an intact DLC layer.

Thus there is a need for a magneto-resistive head transducer which can include elements made of copper, but which is not subject to corrosion when a protective DLC becomes damaged due to very close proximity operation, and which does not rely on drive chemical filters and residual disc lubricant to protect the transducer. Additionally, there is a need for a GMR head which has less potential for transducer-to-disc shorting as the DLC layer becomes damaged.

SUMMARY OF THE INVENTION

Measurements show that current GMR heads are not strongly sensitive to flux decay through the GMR element from the ABS to the top side. FIG. 8 shows the normalized amplitude vs.stripe height of the copper layer for a group of parts. The stripe height (SH) is symbolized by the triangle markers, measured in microinches, the flux, J, is indicated by squares, and the total by diamonds. The graph shows that as the strip height is varied, the amplitude of the sensor response is little changed, whereas variations in the flux affect the amplitude greatly, indicating that current density is the key parameter in determining amplitude.

Because of this effect, some small part of the copper element can be purposely sacrificed at the ABS, by purposely removing the copper layer for some controlled distance inside the transducer. This area is then filled in with an inert protective material (such as carbon or Si) during slider fabrication. The depth of this copper removal area is sufficient, such that the drive burnishing process will not re-expose copper material. The removed copper area effectively becomes a nano-scopic flux guide design, wherein no signal is generated in this area, and some current shunting does occur. Based on the data in FIG. 8, the amount of signal loss will be less than 10% (Cu removal depth of 1 micro-inch, for a total stripe height of 10–15 micro-inch). This effect will be reduced during the burnishing process.

A second concern for exposure during the burnishing process is potential for current spiking to the disc. Current spiking in general is not catastrophic for the head (at least with AMR), but is a very difficult condition for the electronics to recover from. In addition, for a proximity head, if there is one area on the disc where this occurs, spiking could affect many tracks due to the width of exposed leads at the ABS. Thus a second application of the present invention is to preferentially etch back most of the lead area at the ABS to recess it by 1 micro-inch (a similar depth of recessed area to that used on the copper layer), and refill this area with a dielectric material.

This specification discloses a method for producing a disk drive head that will not be subject to corrosive attack, after the surface layer of DLC is damaged by forming a recessed area which is then filled with protective material to a depth greater than the depth of material typically burnished off from the ABS. In addition, a method for reducing the potential for transducer-to-disc shorting is described by forming a recessed area in the proximal portions of electrical leads, the recessed area then being similarly filled with protective dielectric material to a depth greater than that typically removed by drive burnishing. Also disclosed is a slider made by using one or both of these methods.

DISCLOSURE OF INVENTION

Accordingly, it is an object of the present invention to provide a recording head that will not be subject to corrosive attack, after the surface layer of DLC is removed or damaged.

Another object of the invention is to reduce the potential for transducer-to-disc shorting.

And another object of the invention is to provide a recording head that does not require drive chemical filters and residual disc lubricant to protect the copper layer.

Briefly, one preferred embodiment of the present invention is a slider for reading data from a disk surface, the slider including a magneto-resistive head. The head includes a magnetic transducer having a stack of layers, each layer having a proximal end proximal to the disk surface, and a pair of electrical leads, connected to the transducer, each one of the electrical leads also having a proximal end proximal to the disk surface. At least one of the proximal ends of the electrical leads and the layers is recessed to provide one or more recessed areas. The recessed areas are then filled with protective material to a depth such that when the layer of protective material is worn from the proximal ends by burnishing by the disk surface, protective material still remains in the recessed areas.

Also disclosed is a method of fabrication of a slider having recessed areas filled with protective material which protect materials from corrosion and electrical spiking.

An advantage of the present invention is that it does not rely on drive chemical filters and residual disc lubricant to protect the transducer.

Another advantage of the invention is the fly height of the slider can be minimized without risking damage to the copper element by corrosion.

And another advantage of the invention is current spiking to the disk is minimized.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIGS. 6A–C show a magneto-resistive transducer of the prior art in various stages of wear and corrosion;

BEST MODE FOR CARRYING OUT THE INVENTION

Figure 1:
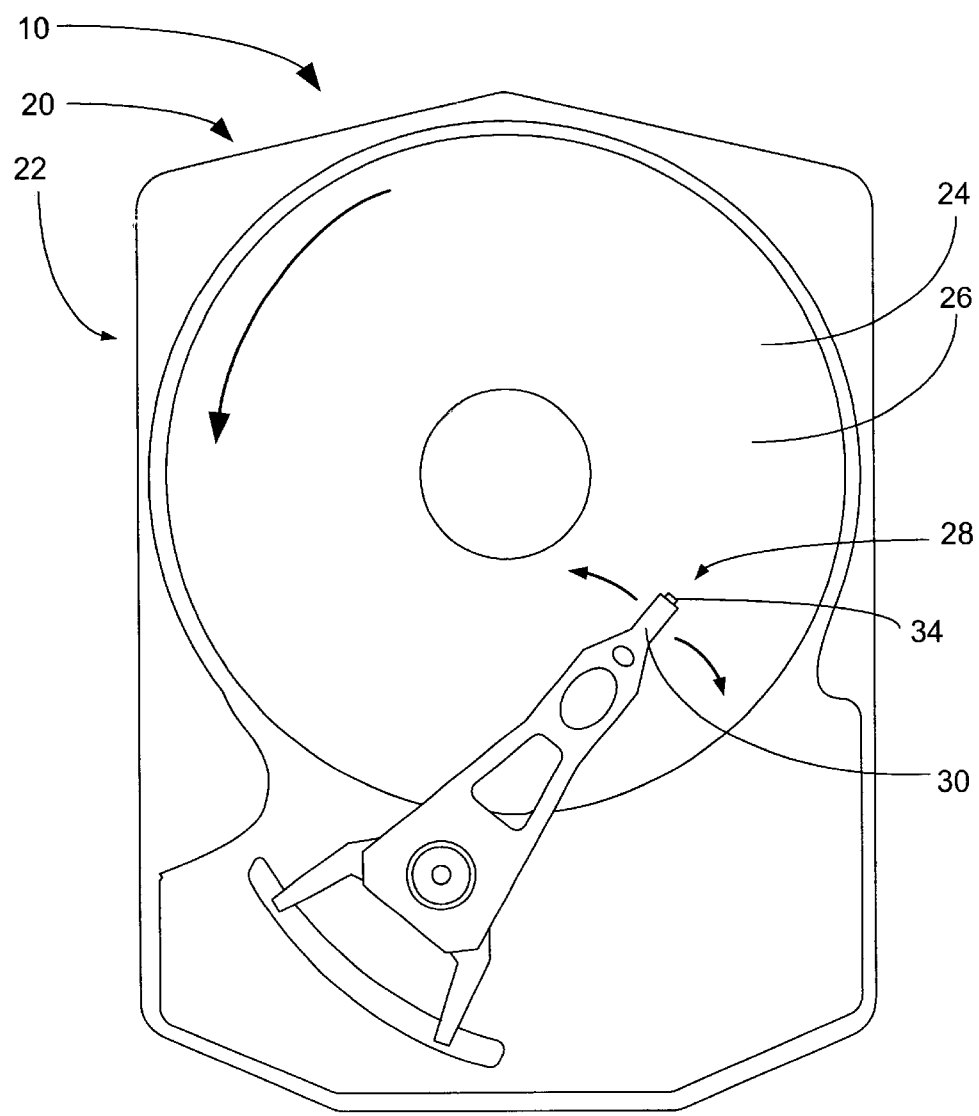
FIG. 1 shows a simplified top plan of a disk drive.

A preferred embodiment of the present invention is a disk drive having a non-corrosive slider. As illustrated in the various drawings herein, a first form of this preferred embodiment of the inventive device is depicted by the general reference character 10.

FIG. 1 shows a simplified top plan view of a magnetic storage device 20, in this case a hard disk drive 22, which generally includes a magnetic storage medium 24, specifically a hard disk 26. A data read/write device 28 includes an arm 30, which supports a slider 34.

Figure 2:
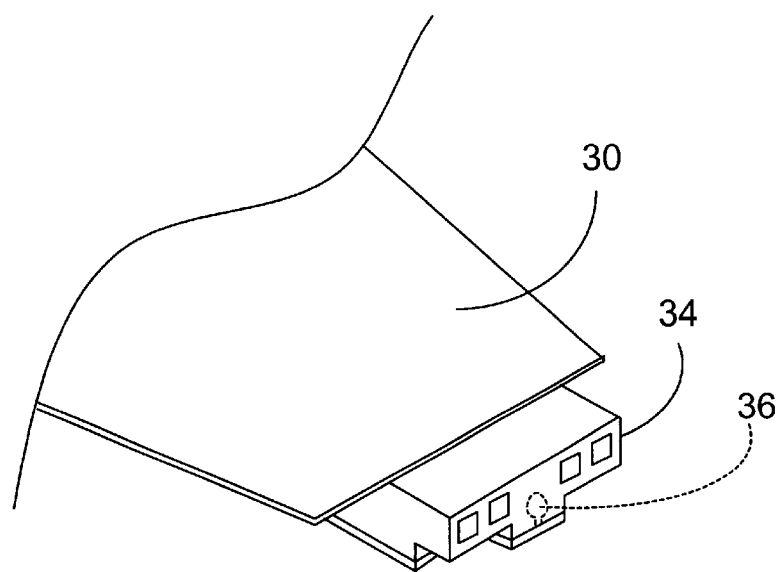
FIG. 2 shows an isometric detail view of the slider of a disk drive.

FIG. 2 illustrates a simplified isometric detail view of the slider 34 showing the arm 30 and a magneto-resistive head 36 which has been embedded in the slider 34.

Figure 3:
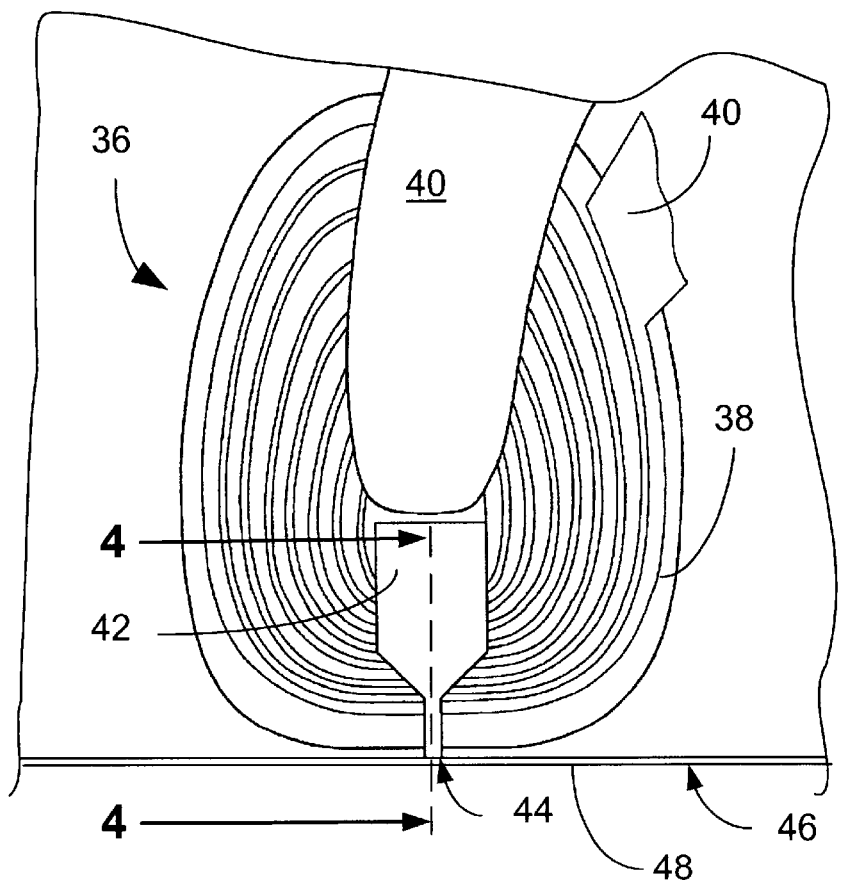
FIG. 3 illustrates a top plan view of a magneto-resistive read/write head.

FIG. 3 shows a top plan view of the components of the magneto-resistive head 36, including a coil 38, leads 40, a top pole piece 42 having a pole tip 44. The surface facing the media disk is supported by a layer of air which is established due to the rotation of the disk under the slider 34, and this surface is known as the Air Bearing Surface or ABS 46. This ABS is covered with a protective coating layer 48.

Figure 4:
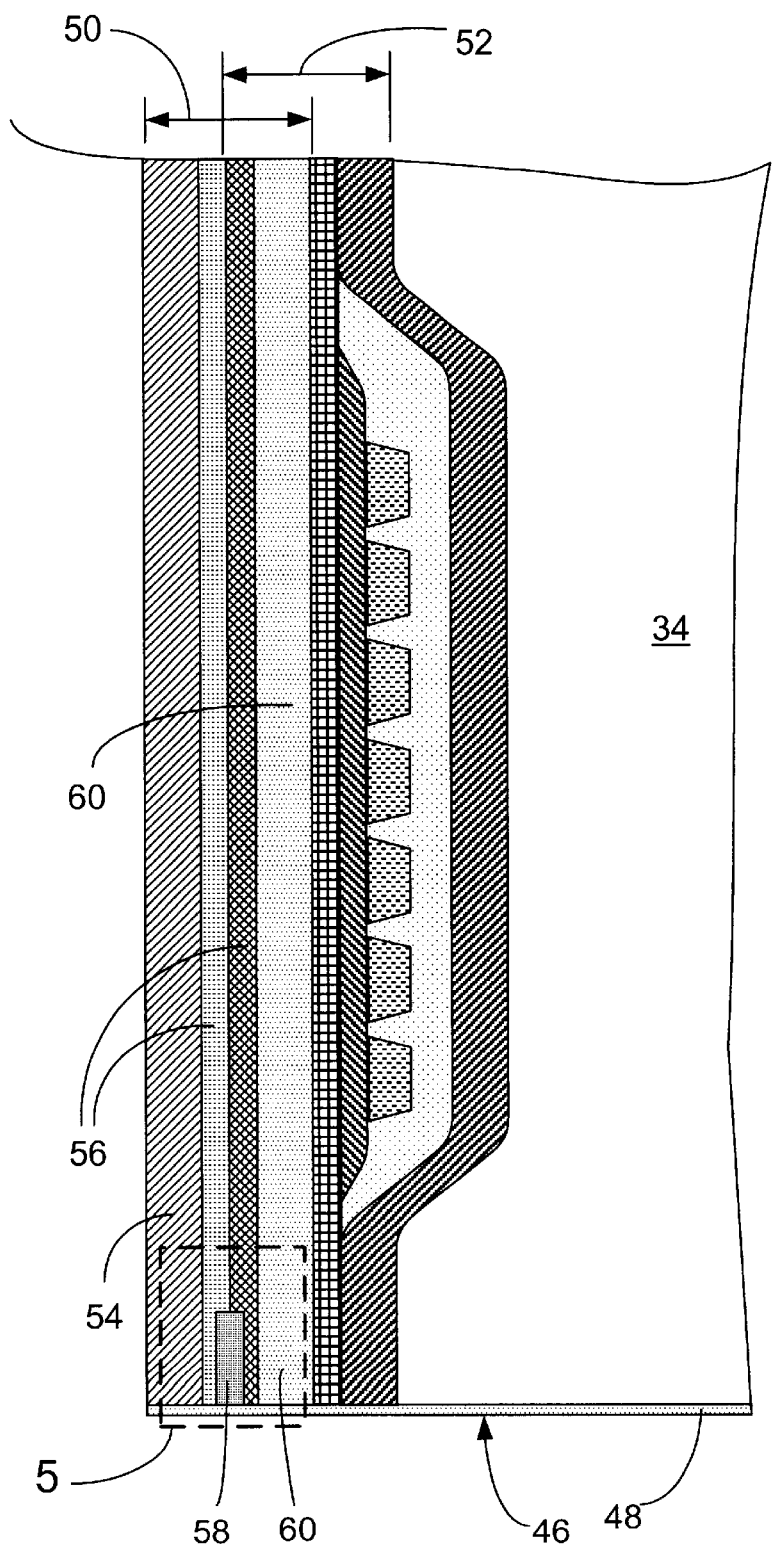
FIG. 4 shows a partial cross sectional view from line 4—4 of FIG. 3, of the magneto-resistive read/write head.

FIG. 4 is a cross-sectional view taken through line 4—4 in FIG. 3. In this type of magneto-resistive head, both the read head 50 and the write head 52 are included on the same device. Layers which make up the components are generally deposited upon one another and include a first shield layer 54, a dual gap layer 56, which surround a Giant Magneto-Resistive transducer, called GMR transducer 58, and a first pole piece layer, which also acts as a second shield 60. The protective coating layer 48 and the ABS 46 are also shown.

Figure 5:
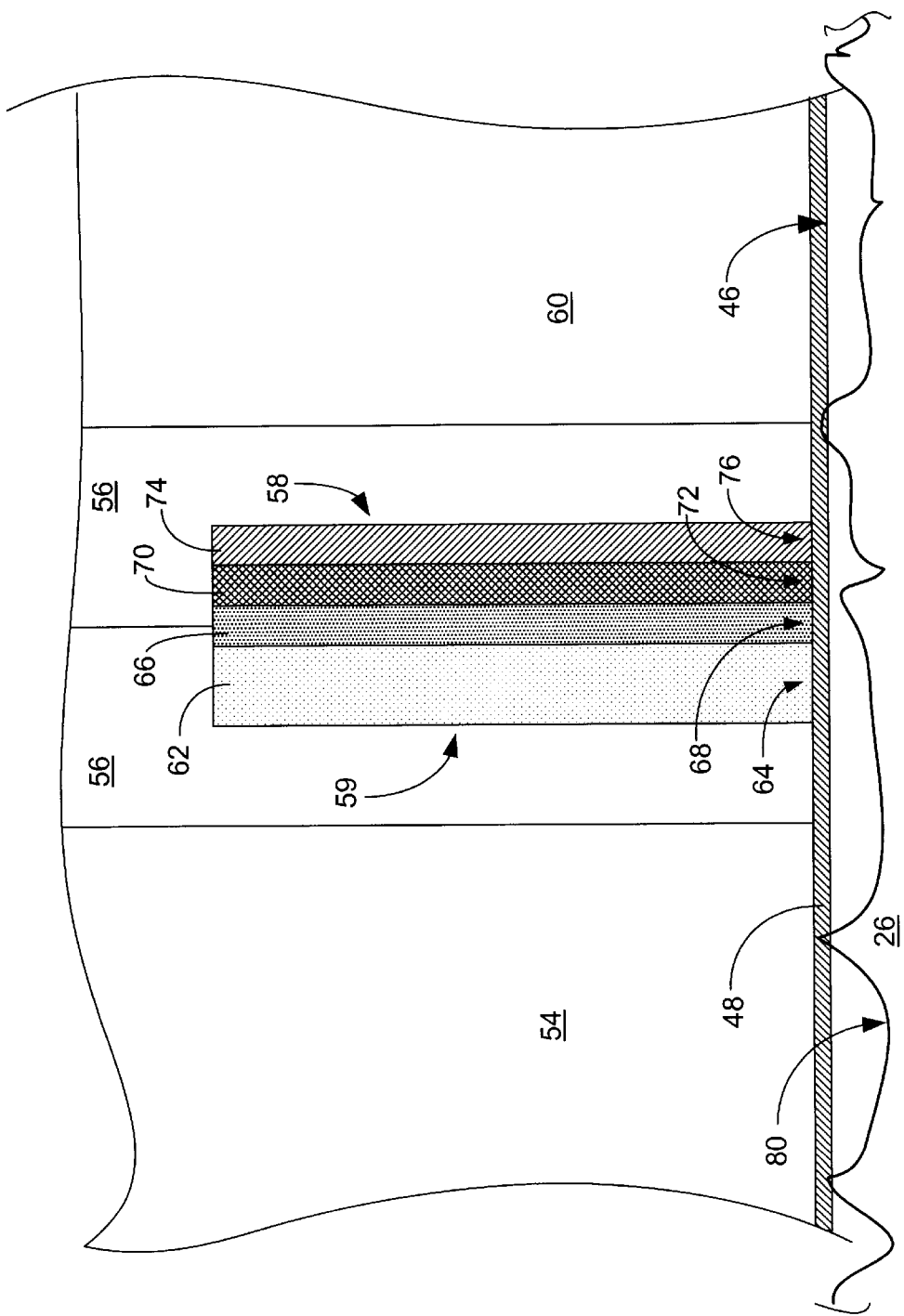
FIG. 5 illustrates a detail view of the magneto-resistive transducer, and surrounding structures which are included in detail box 5 of FIG. 4.

FIG. 5 shows a detailed view of the area seen in the box labeled 5 in FIG. 4. The first shield 54 and the second shield 60, the dual gap layer 56, and the magneto-resistive transducer 58 are seen as well as the ABS 46 and the protective coating layer 46. Within the magneto-resistive transducer 58 are a stack of layers 59 including a first ferromagnetic layer 62, which is also called the free layer, having an end proximal to the disk surface, which shall be called the proximal end 64, and a non-magnetic metal layer 66 having a proximal end 68. This is followed by a second ferromagnetic layer 70, also called the pinned layer, having a proximal end 72, and a anti-ferromagnetic layer 74 having a proximal end 76. The anti-ferromagnetic layer 74 serves to pin the magnetic orientation of the pinned layer 70, while the free layer 62 is free to respond to the magnetic fields on the disk. There may be additional layers but these have been removed for simplicity of discussion.

The proximal ends 64, 68, 72, 76 of the free layer 62, non-magnetic metal layer 66, pinned layer 70 and anti-ferromagnetic layer 74 as well as portions of the first shield 54, second shield 60, and dual gap layer 56 are covered by the protective coating layer 48, which is preferably made of Diamond-Like Carbon (DLC).

Also shown is the surface 80 of the hard disk 26, which has a number of irregularities, some of which contact the ABS 46 and the protective coating 48, acting to burnish it and also smoothing some of the surface irregularities of the disk surface 80 in the process.

FIGS. 6A–C show a magneto-resistive transducer of the prior art in various stages of degradation as the copper layer corrodes. FIG. 6A shows the transducer 58 before any drive burnishing has taken place. The first ferromagnetic layer 62, with its proximal end 64, non-magnetic metal layer 66 having proximal end 68, second ferromagnetic layer 70 having proximal end 72, and anti-ferromagnetic layer 74, having proximal end 76, are shown with protective coating layer 48. In FIG. 6B, the protective layer has been burnished off, and the proximal ends 64, 68, 72 and 76 are shown as being irregular due to contact with irregularities in the disk surface.

FIG. 6C shows the final stage in which the copper non-magnetic layer 66 has been subject to corrosion from the environment, and the former proximal end has been eaten away. The other proximal ends 64, 72, 76 are less affected since their component materials are much less susceptible to corrosion.

Figures 7A, 7B:
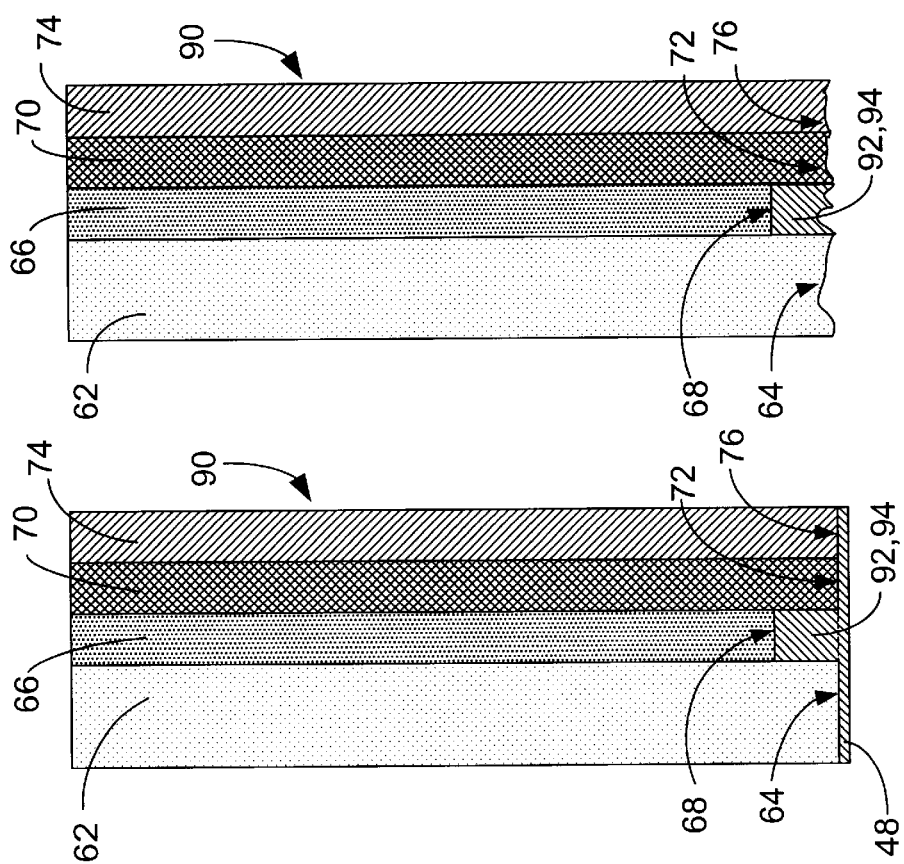
FIGS. 7A–B show a magneto-resistive transducer of the present invention in its initial form and then after drive burnishing has removed the protective coating.

In contrast, FIGS. 7A and B show the transducer 90 of the present invention, having generally a first ferromagnetic layer 62, with its proximal end 64, non-magnetic metal layer 66, preferably copper, having proximal end 68, second ferromagnetic layer 70 having proximal end 72, and anti-ferromagnetic layer 74, having proximal end 76. The proximal end 68 of the copper layer 66 has been recessed by any number of processes such as wet etching, dry etching, including reactive ion etching, reactive ion beam etching, etc. to provide a recessed area 92 which is then filled with protective material 94. This operation of filling with protective material can be done by a number of processes, including ion beam deposit (IBD), chemical vapor deposition (CVD), physical vapor deposition (PVD) and sputtering deposition.

This protective material may be the same protective material as in coating layer 48, which may be applied in the same or different stages, or it may be differing material. The protective material may be Diamond Like Carbon (DLC), silicon or silicon nitride, among others.

FIG. 7B shows the transducer 90 after it has been drive burnished. The protective layer has been removed, but the recessed area 92, filled with protective material 94 remains. The copper 66, can thus be expected to remain intact and protected from corrosion, in contrast to the prior art.

Figure 8:
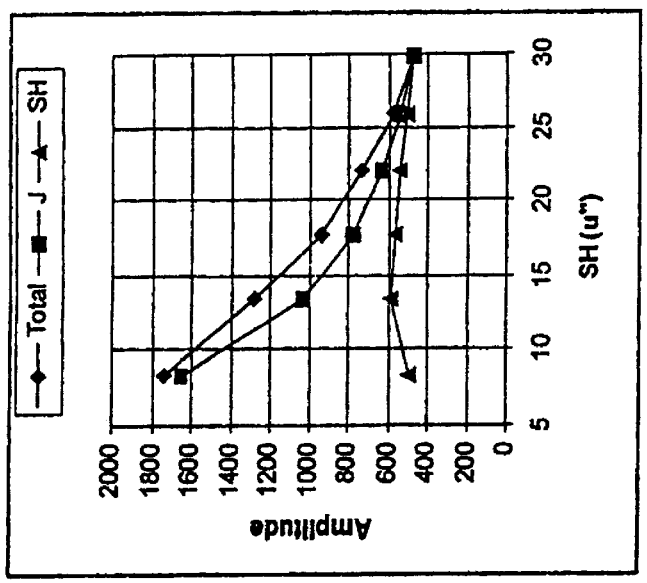
FIG. 8 shows a table of copper stripe height and flux vs. amplitude of sensor response.

FIG. 8 shows the normalized amplitude vs. stripe height of the copper layer for a group of parts. The stripe height (SH) is symbolized by the triangle markers, measured in micro-inches, and the flux, J, is indicated by squares. As discussed above, the graph shows that as the strip height is varied, the amplitude of the sensor response is little changed, whereas variations in the flux affect the amplitude greatly, indicating that current density is the key parameter in determining amplitude. A portion of the copper layer can then be sacrificed in order to implement the present invention without affecting the operation significantly.

Figure 9:
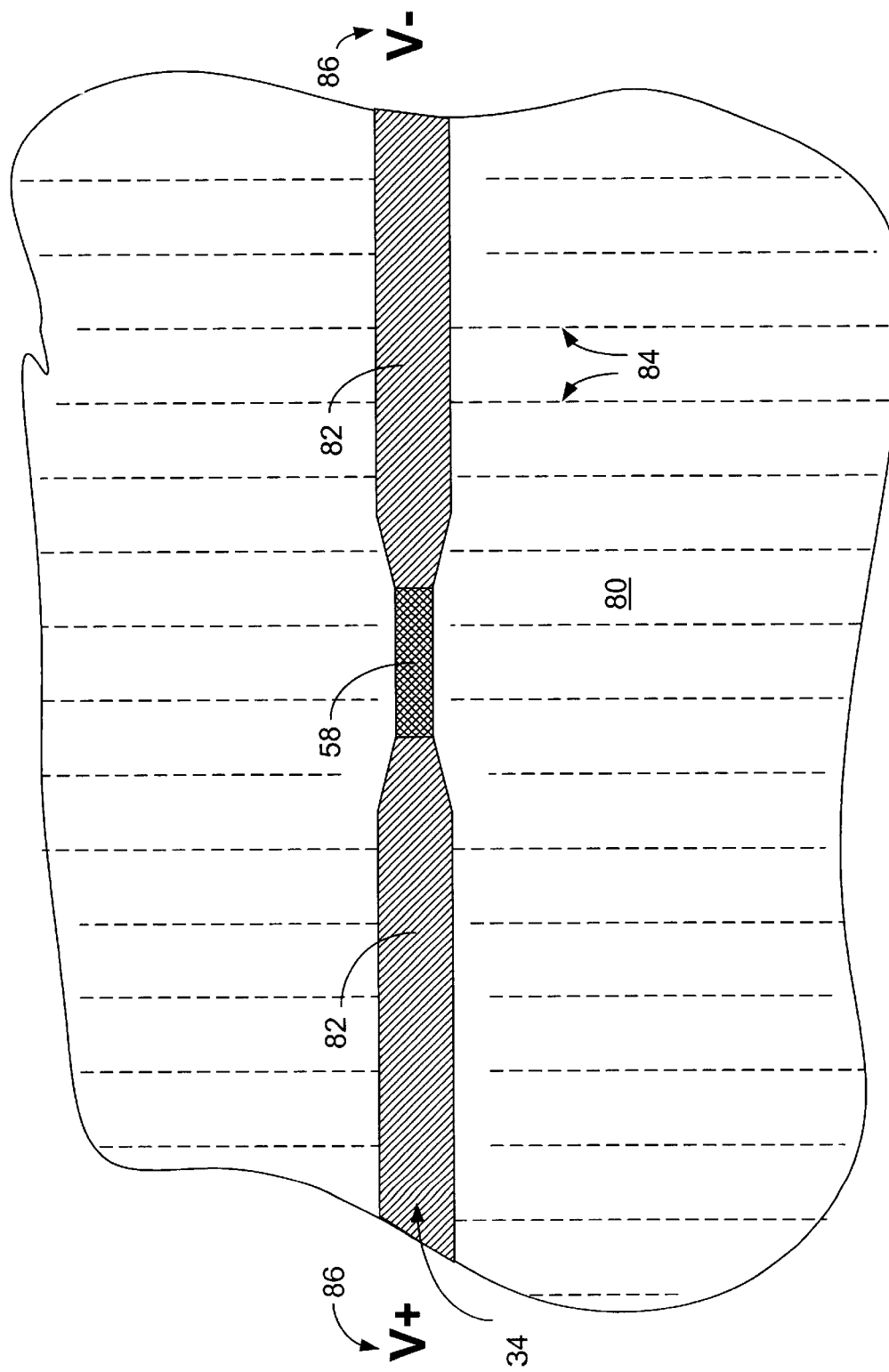
FIG. 9 illustrates a top plan view of a pair of leads attached to a magneto-resistive transducer which is positioned above a disk drive surface having a number of data tracks.

FIG. 9 illustrates a top plan view of a portion of a slider 34 including a magneto-resistive transducer 58 and electrical leads 82, connected to positive and negative voltage sources 86, as they are positioned over a disk drive surface 80 having many tracks 84.

Figure 10:
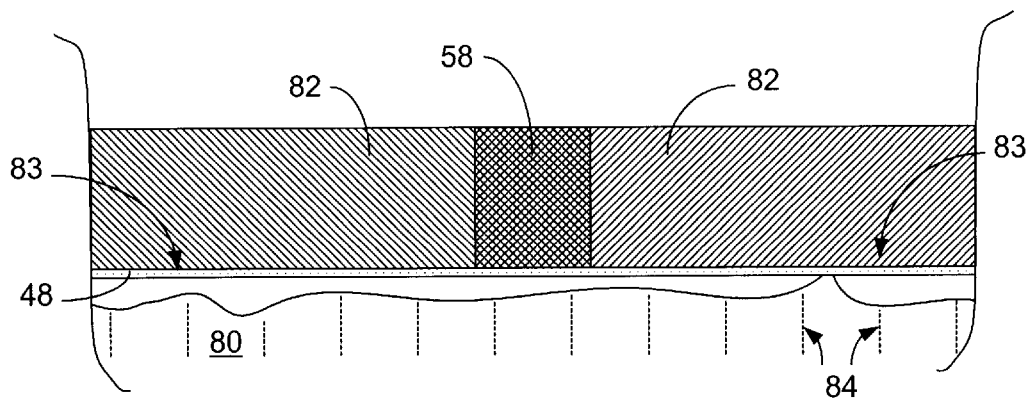
FIGS. 10A and B show a side plan view of a pair of leads and a magneto-resistive transducer with a protective coating layer as originally fabricated and then showing the effect of drive burnishing, which results in electrical spiking.
Figure 10B:
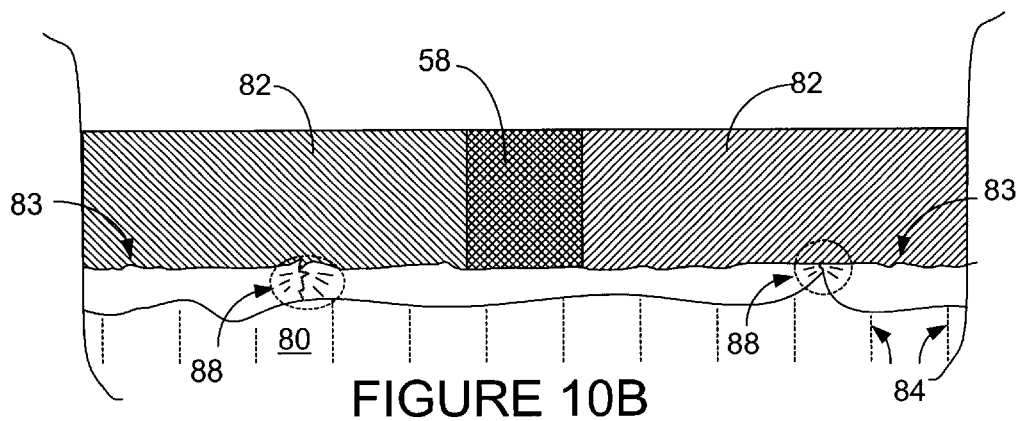

FIG. 10A shows a side plan view of the same slider portion 34 having a GMR transducer 58 and electrical leads 82 having proximal ends 83 near the disk surface 80, onto which a protective coating layer 48 is provided. This protective coating layer 48 is then burnished away, as seen in prior art FIG. 10B. The voltage on the proximal ends 83 of the leads 82 can then arc to the disk surface 80 at high points, etc. The leads 82 extend across numerous tracks, and thus the opportunity for spiking is compounded. Arcs 88 are shown in dashed circles at a few points across the width of the leads 82.

Figure 11:
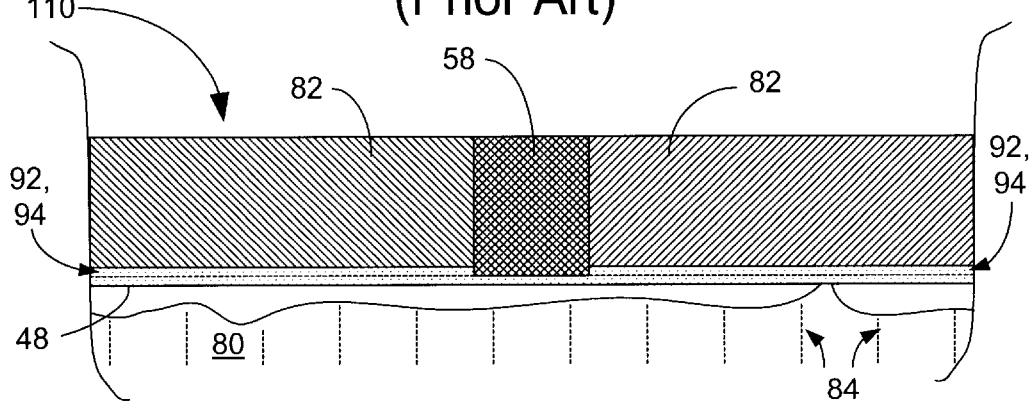
FIG. 11 illustrates a side plan view of the second embodiment of the present invention in which recessed areas are formed in the electrical leads, and then filled with protective material.

FIG. 11 illustrates a second embodiment of the present invention 110, in which the leads 82 have been etched back and the recessed areas 92 are then filled with protective material 94 in a similar manner to that discussed above. When the protective coating layer 48 is then burnished away, protective material 94 remains in the recessed areas 92, which acts as an insulator to prevent spiking.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A magneto-resistive transducer including a stack of layers, said transducer comprising:
   first ferromagnetic layer having an end proximal to said disk surface;
   a non-magnetic metal layer formed on said first ferromagnetic layer, said non-magnetic metal layer having an end proximal to said disk surface;
   a second ferromagnetic layer formed on said non-magnetic metal layer, said second ferromagnetic layer having an end proximal to said disk surface;
   an antiferromagnetic layer formed on said second ferromagnetic layer, said antiferromagnetic layer having an end proximal to said disk surface;
   a layer of protective material applied to the proximal ends of the stacked layers;
   said proximate end of said non-magnetic metal layer being recessed from said disk surface to form a recessed area; and
   said recessed area being filled with protective material to a depth such that when said layer of protective material is worn from said proximal ends of said first and second ferromagnetic layers, and said anti-ferromagnetic layer, by burnishing by the disk surface, protective material still remains in said recessed area of said non-magnetic metal layer.

2. A magneto-resistive transducer as recited in claim 1, wherein:
   said non-magnetic metal layer is copper.

3. A magneto-resistive transducer as recited in claim 1, wherein:
   said protective material which is used to fill said recessed area is chosen from a group consisting of Diamond-Like Carbon, silicon, and silicon nitride.

4. A magneto-resistive transducer as recited in claim 1, wherein:
   said layer of protective material and said protective material which is used to fill said recessed area is the same and is applied in the same coating process.

5. A magneto-resistive transducer as recited in claim 1, wherein:
   said layer of protective material and said protective material which is used to fill said recessed area are applied separately in a two-stage process.

6. A magneto-resistive transducer as recited in claim 1, wherein:
   said transducer is attached to electrical leads which supply current to said magneto-resistive transducer, said electrical leads having proximal portions proximal to said disk surface, wherein said proximal portions of said electrical leads are recessed to provide recessed areas; and
   said recessed areas being filled with protective material to a depth such that when said layer of protective material is worn by burnishing by the disk surface, protective material still remains in said recessed areas of said electrical leads.

\* \* \* \* \*